(12) United States Patent
Tsuruma et al.

(10) Patent No.: US 9,804,448 B2
(45) Date of Patent: Oct. 31, 2017

(54) LIQUID CRYSTAL DISPLAY DEVICE

(71) Applicant: Japan Display Inc., Tokyo (JP)

(72) Inventors: Takeyuki Tsuruma, Tokyo (JP); Hidemasa Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/596,535

(22) Filed: Jan. 14, 2015

(65) Prior Publication Data

US 2015/0205171 A1 Jul. 23, 2015

(30) Foreign Application Priority Data

Jan. 17, 2014 (JP) .................................. 2014-006748

(51) Int. Cl.
G02F 1/1343 (2006.01)
G02F 1/1337 (2006.01)

(52) U.S. Cl.
CPC .. *G02F 1/134309* (2013.01); *G02F 1/134363* (2013.01); *G02F 1/133707* (2013.01)

(58) Field of Classification Search
CPC ................................................ G02F 1/134309
See application file for complete search history.

(56) References Cited

U.S. PATENT DOCUMENTS

| | | | | |
|---|---|---|---|---|
| 2004/0027524 A1* | 2/2004 | Shiota | ............... | G02F 1/133512 349/129 |
| 2008/0036930 A1 | 2/2008 | Konno et al. | | |
| 2009/0046234 A1* | 2/2009 | Tanaka | ............... | G02F 1/134363 349/141 |
| 2010/0157228 A1* | 6/2010 | Sakurai | ................. | G02F 1/1337 349/141 |
| 2012/0081647 A1* | 4/2012 | Sonoda | ............. | G02F 1/133788 349/123 |
| 2012/0299028 A1* | 11/2012 | Tanabe | .............. | G02F 1/136213 257/88 |
| 2013/0093988 A1* | 4/2013 | Suzuki | .............. | G02F 1/134363 349/141 |

FOREIGN PATENT DOCUMENTS

| | | |
|---|---|---|
| JP | 2008-96839 A | 4/2008 |
| JP | 2009-47817 A | 3/2009 |
| JP | 2011-164661 A | 8/2011 |
| JP | 2012-137792 A | 7/2012 |

\* cited by examiner

*Primary Examiner* — Edmond Lau

(74) *Attorney, Agent, or Firm* — Ulmer & Berne LLP

(57) ABSTRACT

An IPS LCD that not only increases the screen luminance but also prevents the occurrence of image blurs by reducing the area of disclination and preventing the liquid crystal molecules from rising in a direction normal to the TFT substrate. A pixel electrode is disposed in the pixel surrounded by two gate lines and two data lines. A planar common electrode is located below the pixel electrode with an inter-layer insulating film provided therebetween. The pixel electrode includes slits each being open at the edge on one side and has the shape of a comb. Liquid crystals with negative dielectric anisotropy are used as liquid crystal. The above structure increases the transmissive area of the pixel up to the open edges of the slits and also prevents the liquid crystal molecules from rising in a direction normal to the TFT substrate, thereby preventing the occurrence of blurs.

11 Claims, 10 Drawing Sheets

FIG. 6

| | COMPARATIVE EXAMPLE | PRESENT INVENTION |
|---|---|---|
| SHAPE OF PIXEL ELECTRODE | | |
| DISCLINATION | NOT PRODUCED | NOT PRODUCED |
| TRANSMITTANCE (COMPARISON WITH RESPECT TO REFERENCE) | 100% | 103.7% |
| BLUR (OBSERVED AT 4.5V) | NOT PRODUCED | NOT PRODUCED |

FIG. 7A
FIG. 7B
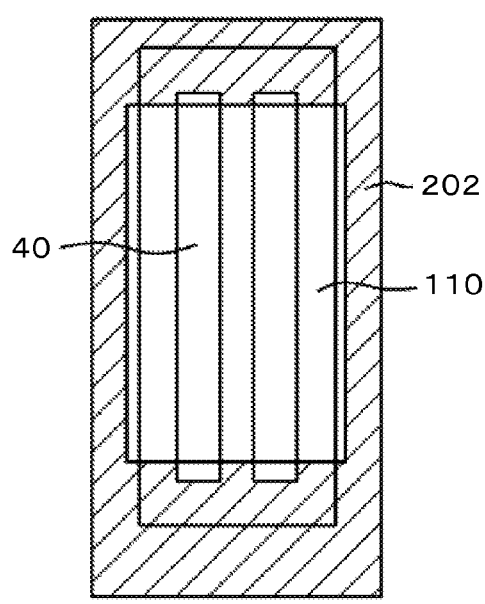
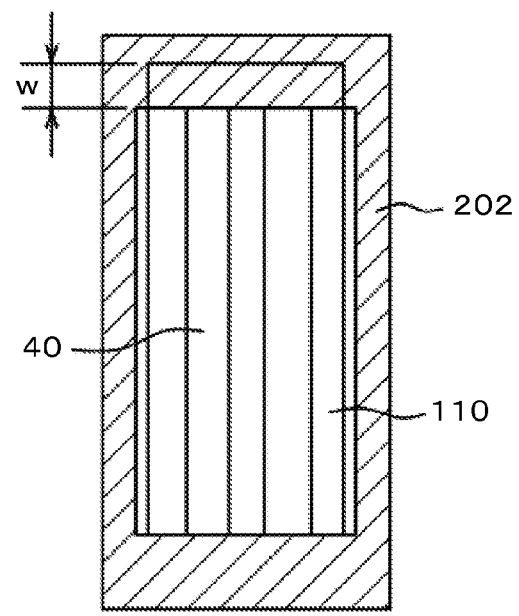

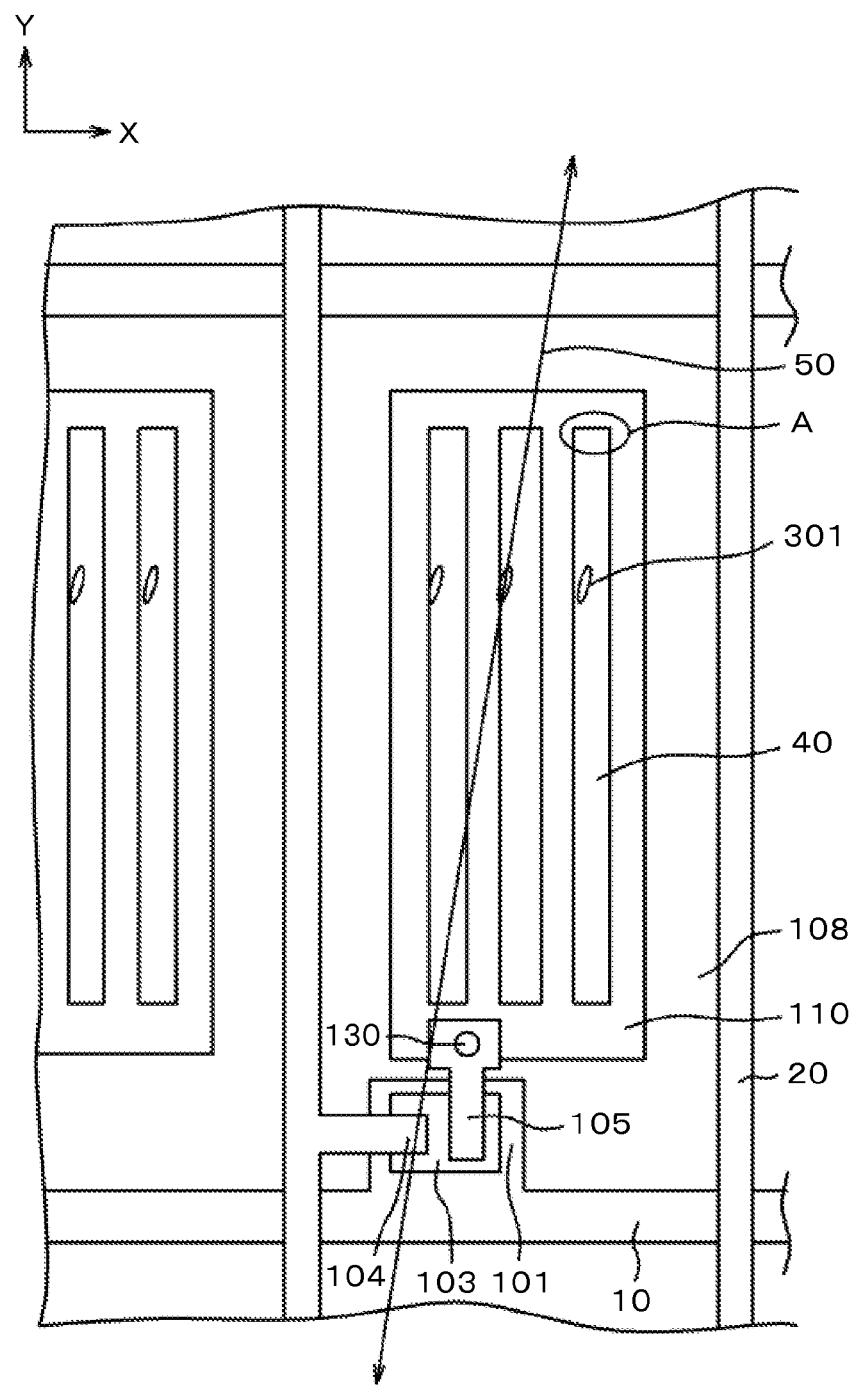

LIQUID CRYSTAL DISPLAY DEVICE

CLAIM OF PRIORITY

The present application claims priority from Japanese Patent Application JP 2014-006748 filed on Jan. 17, 2014, the content of which is hereby incorporated by reference into this application.

BACKGROUND OF THE INVENTION

1. Field of the Invention

The present invention relates to display devices and particularly to an IPS liquid crystal display with excellent viewing angle characteristics and increased luminance.

2. Description of the Related Art

A typical liquid crystal display (LCD) includes a TFT substrate, a counter substrate, and a liquid crystal layer. On the TFT substrate, pixels each having a pixel electrode, a thin film transistor (TFT), and the like are formed in the form of a matrix. The counter substrate is disposed so as to face the TFT substrate with the liquid crystal layer sandwiched therebetween. On the surface of the counter substrate that faces the TFT substrate, color filters are formed such that they are located above the pixel electrodes. Such an LCD forms an image by controlling the transmittance of the liquid crystal molecules on a pixel-by-pixel basis.

Since LCDs are flat and lightweight, the range of their application is getting wider in various fields. For instance, small-sized LCDs are widely used in mobile phones, DSCs (digital still camera), and so on. In LCDs, viewing angle characteristics are an important issue. When an LCD has poor viewing angle characteristics, the screen luminance and the colors displayed on the screen tend to change greatly depending on viewing angles. When it comes to viewing angle characteristics, IPS (in-plane switching) LCDs are currently good. In IPS LCDs, lateral electric fields are used to drive liquid crystal molecules.

There are many variations of IPS. For example, in one IPS method, a comb-shaped pixel electrode is disposed above a planar common electrode with an insulating film placed therebetween, and the electric fields produced between the pixel electrode and the common electrode are used to rotate the liquid crystal molecules. Because this method leads to a greatly increased transmittance rate, it is currently used most frequently. In such an IPS LCD, the relations between the shape of pixel electrodes and the axis of alignment are determined such that the liquid crystal molecules within a pixel rotate in the same direction, that is, in the intended direction. Despite adoption of such a configuration, it is still difficult to cause all of the liquid crystal molecules within a pixel to rotate in the same direction. Thus, it follows that the pixel has areas in which liquid crystal molecules rotate in the opposite direction.

When a pixel has an area in which liquid crystal molecules rotate in the intended direction and an area in which liquid crystal molecules rotate in the opposite direction, the rotation of liquid crystal molecules becomes unstable at the boundary between the two areas. This phenomenon is called 'disclination.' The area of disclination varies with the intensity of electric fields as well, and disclination works against the screen luminance and stability sought.

JP-2008-96839-A discloses a pixel structure in which the part of a common electrode that is located in the area of disclination is removed therefrom. JP-2012-137792-A discloses a pixel structure for stabilizing the orientation of liquid crystals in which the intensity of electric fields is increased in the area of disclination. JP-2011-164661-A also discloses a pixel structure for stabilizing the orientation of liquid crystals in which a pixel electrode is bent, and disclination is allowed to occur near the bent section. Further, in the pixel structure disclosed in JP-2009-47817-A, two domains are created within a pixel, and a pixel electrode includes a bridge section located at the boundary between the two domains so that the electric fields produced from the bridge section stabilize the orientation of liquid crystals.

SUMMARY OF THE INVENTION

All of the LCD devices mentioned in the background section use liquid crystals with positive dielectric anisotropy (hereinafter referred to simply as 'positively anisotropic LCs'). Positively anisotropic LCs are ones in which the long axes of their molecules face the direction of electric fields. On the other hand, liquid crystals with negative dielectric anisotropy (hereinafter referred to simply as 'negatively anisotropic LCs') are ones in which the short axes of their molecules face the direction of electric fields. Positively anisotropic LCs are prone to the problem of disclination stated above. When disclination occurs within a certain area of a pixel, light is not transmitted at that area, resulting in reduced transmittance of the pixel and reduced luminance of the screen.

FIG. 10 is a plan view of a pixel of a conventional IPS LCD. In FIG. 10, a planar common electrode 108 is formed below a rectangular pixel electrode 110 having slits 40. Liquid crystal molecules 301 are aligned in the direction of the alignment axis 50 of an alignment film formed on the pixel electrode 110. The alignment axis 50 is tilted by 10 to 15 degrees with respect to the long axis of the slits 40 of the pixel electrode 110 (i.e., with respect to the y-axis). The reason is that the liquid crystal molecules 301 need to rotate in the same direction when a voltage is applied to the pixel electrode 110.

A video signal is transmitted from a source electrode 105 of a TFT via a through-hole 130 to the pixel electrode 110. When the pixel electrode 110 receives the signal, electric force lines are produced between the pixel electrode 110 and the common electrode 108, and the lateral components of the electric force lines cause the rotation of the liquid crystal molecules 301, thereby controlling the transmittance rate of the liquid crystal layer. In FIG. 10, positively anisotropic LCs are used as the liquid crystal molecules 301. The use of positively anisotropic LCs in the pixel structure of FIG. 10 results in the occurrence of disclination at the edges of the slits 40 of the pixel electrode 110 (i.e., in the area A of FIG. 10). Because the area in which disclination occurs needs to be covered with a black matrix formed underneath the counter substrate, the transmittance rate of the pixel decreases inevitably. The detailed structure of FIG. 10 will later be described with reference to FIG. 1.

Another problem of positively anisotropic LCs is that the liquid crystal molecules are more likely to rise in a direction normal to the TFT substrate when the screen is pressed (see FIG. 4A). Such rising of the liquid crystal molecules tends to occur in areas in which disclination is occurring. Also, in the case of an IPS LCD, such rising of LC molecules often leads to a blur on the screen.

Thus, an object of the present invention is to increase the luminance of an LCD and prevent the occurrence of blurs on the screen by suppressing disclination and preventing the liquid crystal molecules from rising in a direction normal to the TFT substrate when the screen is pressed.

The present invention is designed to address the above problems, and its main feature is that it adopts the use of negatively anisotropic LCs to suppress the occurrence of disclination and to prevent the liquid crystal molecules from rising in a direction normal to the TFT substrate when the screen is pressed. In negatively anisotropic LCs, polar groups are located on the short-axis side of the liquid crystal molecules. Thus, in terms of molecular structure, negatively anisotropic LCs have a smaller dielectric anisotropy $\Delta \in$ than positively anisotropic LCs. Also, in the case of negatively anisotropic LCs, the rotation of liquid crystal molecules due to voltage application is less likely to occur than in the case of positively anisotropic LCs.

In the present invention, negatively anisotropic LCs are used with the particular intentions stated above, and by adopting the pixel electrode shape that suits the negatively anisotropic LCs, their excellent characteristics can be exploited. As a result, the luminance of the screen can be improved, and the screen is less likely to have a blur when pressed. The following are the specific means for achieving the above object.

(1) A liquid crystal display device comprising: a plurality of gate lines extending in a first direction and arranged in a second direction; a plurality of data lines extending in the second direction and arranged in the first direction; a plurality of pixels formed by the intersection of the plurality of gate lines and the plurality of data lines, each of the plurality of pixels having a pixel electrode; a TFT substrate having the plurality of pixels formed thereon in the form of a matrix; a counter substrate; and a liquid crystal layer sandwiched between the TFT substrate and the counter substrate, wherein a common electrode is formed below the pixel electrode with an inter-layer insulating layer located therebetween, wherein the liquid crystal layer includes liquid crystals with negative dielectric anisotropy, and wherein the pixel electrode includes a plurality of slits, each being open at an edge on one side.

(2) The liquid crystal display device recited in (1), wherein the pixel electrode has the shape of a rectangular comb.

(3) The liquid crystal display device recited in (1), wherein the pixel electrode has the shape of a parallelogram comb.

(4) A liquid crystal display device comprising: a plurality of gate lines extending in a first direction and arranged in a second direction; a plurality of data lines extending in the second direction and arranged in the first direction; a plurality of pixels formed by the intersection of the plurality of gate lines and the plurality of data lines, each of the plurality of pixels having a pixel electrode; a TFT substrate having the plurality of pixels formed thereon in the form of a matrix; a counter substrate; and a liquid crystal layer sandwiched between the TFT substrate and the counter substrate, wherein a common electrode is formed below the pixel electrode with an inter-layer insulating layer located therebetween, wherein the liquid crystal layer includes liquid crystals with negative dielectric anisotropy, and wherein the pixel electrode includes: a bus electrode extending in the first direction; a first comb-shaped electrode connected to one side of the bus electrode and tilted by a particular angle with respect to the second direction; and a second comb-shaped electrode connected to the other side of the bus electrode and tilted with respect to the second direction by the particular angle in a direction opposite to the tilt direction of the first comb-shaped electrode.

(5) The liquid crystal display device recited in (4) wherein a video signal is transmitted to the first and second comb-shaped electrodes of the pixel electrode via the bus electrode.

The present invention allows an IPS LCD to have a reduced area of disclination and increased screen luminance. Moreover, because the liquid crystal molecules become less likely to rise in a direction normal to the TFT substrate, the screen is less likely to have an image blur when pressed.

BRIEF DESCRIPTION OF THE DRAWINGS

FIG. 6 is a table showing the difference between two pixel transmittance rates due to the differences in pixel electrode shape;

FIGS. 7A and 7B are diagrams showing comparison between the opening of a black matrix according to the invention and the opening of a black matrix according to a comparative example;

FIG. 10 is a plan view illustrating the structure of a pixel according to a comparative example.

DESCRIPTION OF THE PREFERRED EMBODIMENTS

Embodiments of the present invention will now be described in detail.

Embodiment 1

Figure 1:
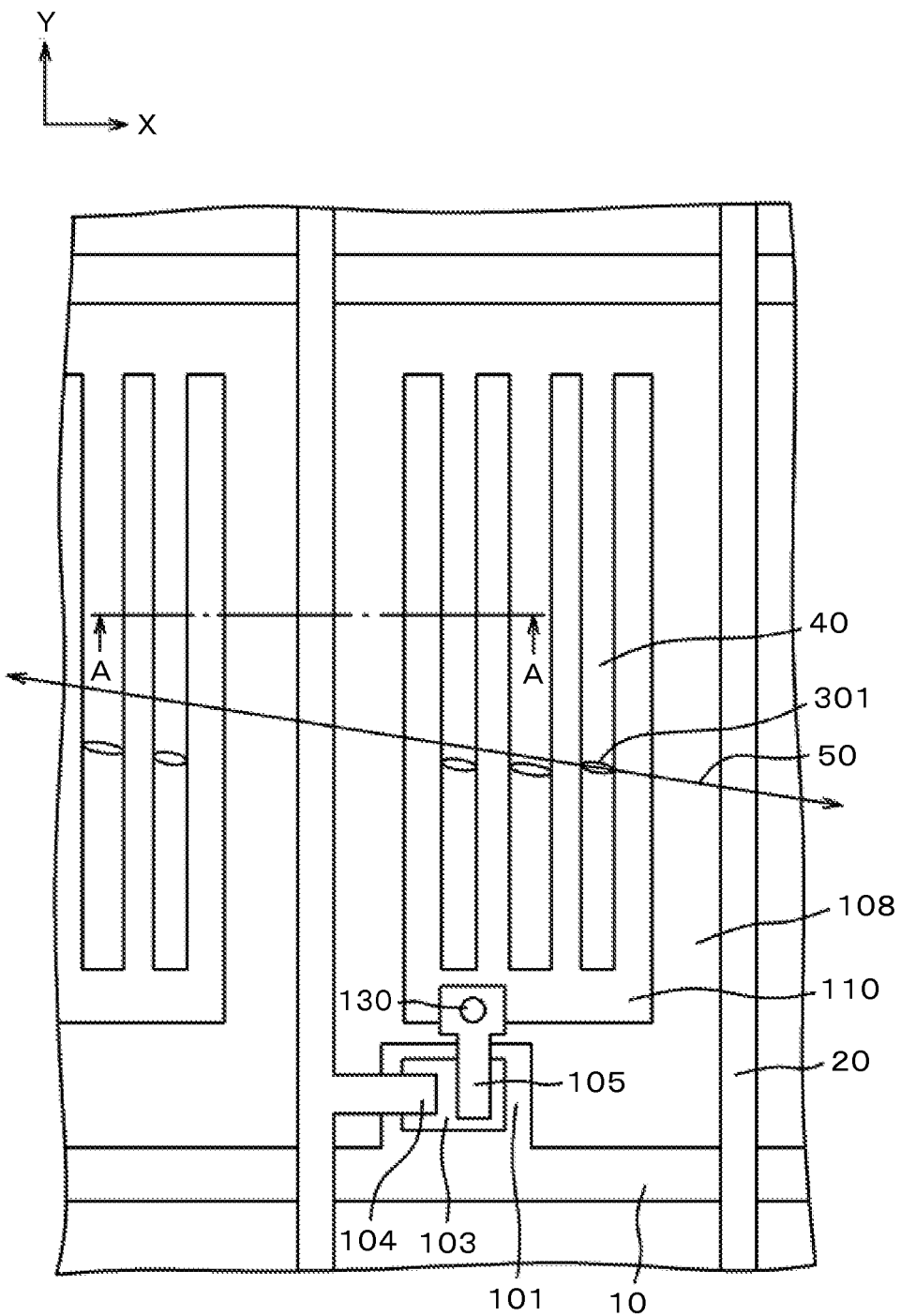
FIG. 1 is a plan view of a pixel of an LCD according to Embodiment 1 of the invention.
Figure 2:
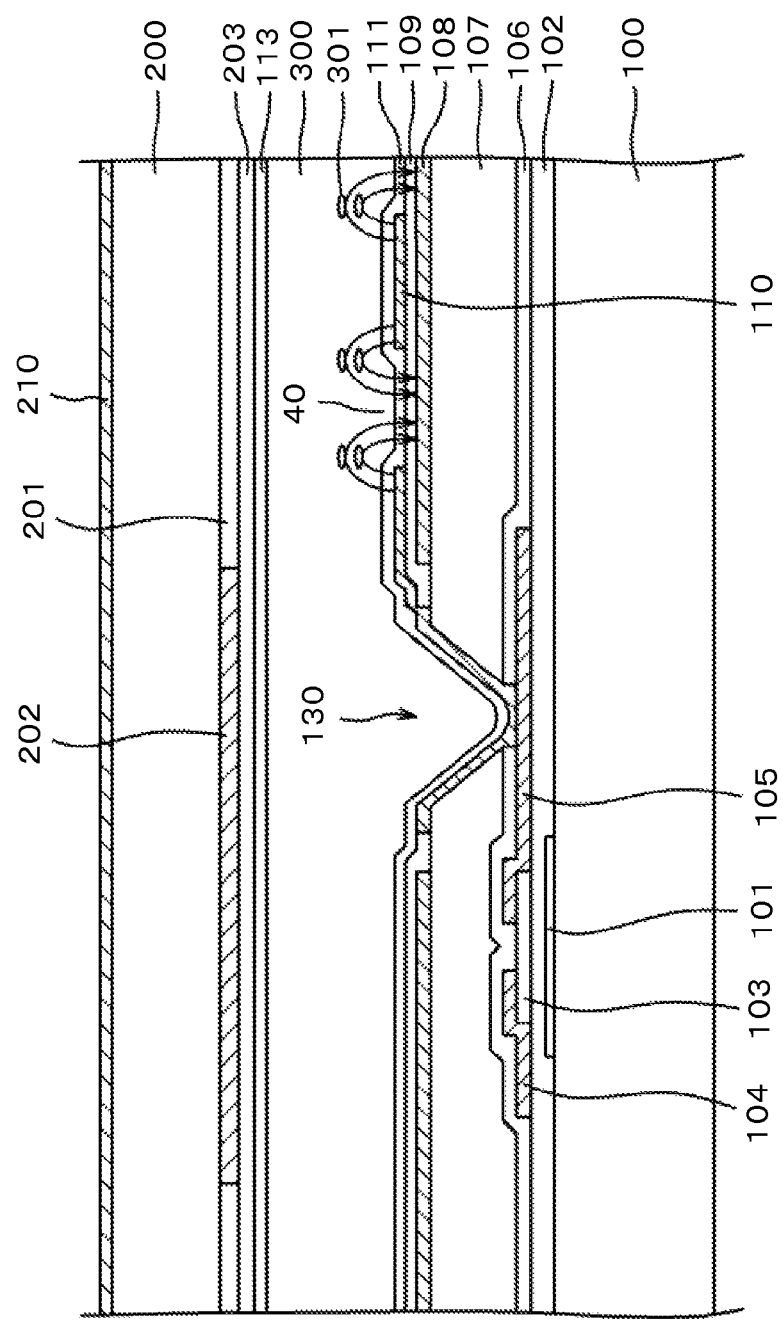
FIG. 2 is a cross section of the pixel of FIG. 1.
Figure 3:
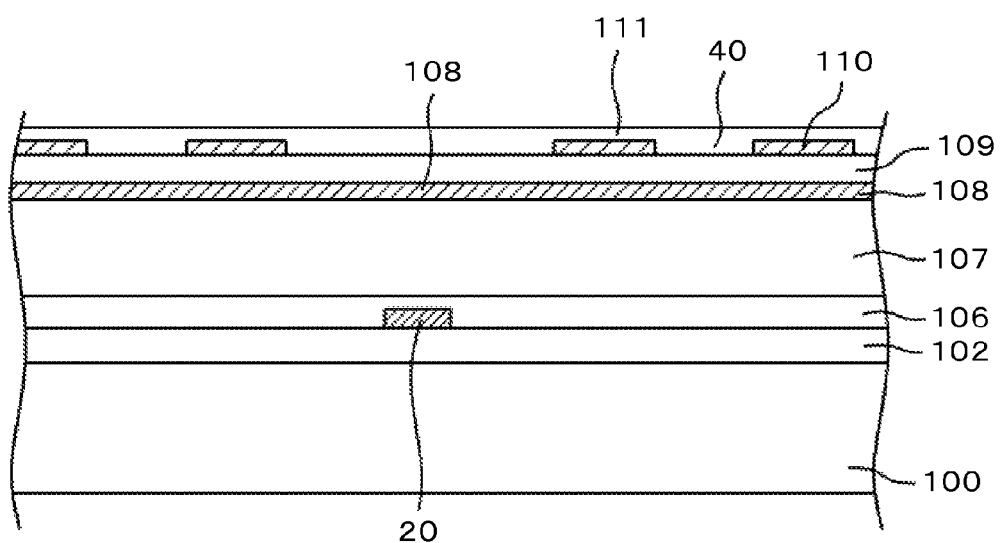
FIG. 3 is a cross section taken along line A-A of FIG. 1.

FIG. 1 is a plan view illustrating the structure of a pixel according to Embodiment 1 of the present invention while FIG. 2 is a cross section of the pixel. FIG. 3 is a cross section taken along line A-A of FIG. 1. In the present invention, negatively anisotropic LCs are used as liquid crystals 301. First, the pixel structure is described with reference to the cross section of FIG. 2. As illustrated in FIG. 2, a gate electrode 101 is formed on a glass-made TFT substrate 100, and a gate insulting film 102 is deposited on the gate electrode 101 and the TFT substrate 100. A semiconductor layer 103 is formed above the gate electrode 101 with the gate insulating film 102 located therebetween.

The semiconductor layer 103 is formed of a-Si. For electrical connection with a drain electrode 104 and a source electrode 105, the semiconductor layer 103 also includes n+a-Si. An inorganic passivation film 106 is deposited on the semiconductor layer 103, drain electrode 104, and source electrode 105. On the inorganic passivation film 106 is an organic passivation film 107, which acts also as a planarizing film. The organic passivation film 107 is relatively thick; its thickness is in the range of 1 to 3 μm. It should be noted that the source electrode 105 and the drain electrode 104 can instead be referred to as the drain electrode and the source electrode, respectively.

A flat ITO common electrode 108 is formed on the organic passivation film 107, and an inter-layer insulating film 109 is deposited to cover the common electrode 108. Formed on the inter-layer insulating film 109 is a pixel electrode 110 having slits 40. The pixel electrode 110 is connected to the source electrode 105 via a through-hole 130. An alignment film 111 is formed over the pixel electrode 110 in order to subject the liquid crystals to initial alignment. When a video signal is applied to the pixel electrode 110, electric force lines are produced between the pixel electrode 110 and the common electrode 108, and the lateral components of the electric force lines cause the rotation of the liquid crystals 301, thereby controlling the light from a backlight.

A counter substrate 200 is disposed above the TFT substrate 100 with a liquid crystal layer 300 located therebetween. A color filter 201 is formed underneath the counter substrate 200 such that the color filter 201 is located above the pixel electrode 110, and a black matrix 202 lies between that color filter 201 and the color filter of an adjacent pixel. An overcoat 203 is formed underneath the color filter 201 and black matrix 203, and an alignment film 113 is located underneath the overcoat 203. Because no common electrode is formed on the side of the counter substrate 200, an external ITO conductive film 210 is formed on the outer surface of the counter substrate 200 for the purpose of blocking external noise.

The TFT of FIG. 2 is of a so-called bottom-gate type, but a top-gate TFT can also be used. In that case, the gate electrode 101 is formed on the semiconductor layer 103. In addition, the semiconductor layer 103 can also be formed of poly-Si in place of a-Si.

FIG. 1 is a plan view illustrating a pixel structure according to the present invention. As illustrated in FIG. 1, gate lines 10 extend in a crosswise direction and arranged in a longitudinal direction at particular intervals. On the other hand, data lines 20 extend in a longitudinal direction and are arranged in a crosswise direction at particular intervals. Located within the pixel of FIG. 1 are the TFT, the pixel electrode 110, and the common electrode 108.

In FIG. 1, the semiconductor layer 103 is formed above the gate electrode 101 with the gate insulating film 102 (not illustrated) located therebetween. The gate electrode 101 diverges from the one of the gate lines 10. On the semiconductor layer 103 are the drain electrode 104, which diverges from one of the data lines 20, and the source electrode 105, which is located across from the drain electrode 104. Thus, a TFT channel is present between the drain electrode 104 and the source electrode 105. The source electrode 105 is electrically connected to the pixel electrode 110 via the through-hole 130, thereby transmitting video signals to the pixel electrode 110.

As already stated with reference to FIG. 2, the planar common electrode 108 is formed below the pixel electrode 110. As illustrated in FIG. 2, when a signal voltage is applied to the pixel electrode 110, the resultant electric force lines pass through the liquid crystal layer 300 and reach the common electrode 108 via the slits 40 and the outer side of the pixel electrode 110. The lateral components of the electric force lines in turn cause the rotation of the liquid crystals, thereby controlling the transmittance rate of the liquid crystal layer 300.

Referring back to FIG. 1, the alignment axis 50 of the alignment film 111 that subjects the liquid crystal molecules to initial alignment is tilted by 10 to 15 degrees with respect to the direction in which the gate lines 10 extend (i.e., with respect to the x-axis of FIG. 1). The reason is that the negatively anisotropic LCs need to rotate in the same direction within the pixel. The alignment axis 50 of FIG. 1 differs from the alignment axis 50 of FIG. 10 by 90 degrees.

The major difference between the pixel electrode 110 of FIG. 1 and the pixel electrode 110 of FIG. 10 is that the slits 40 of the pixel electrode 110 are open at the y-axis directional edge of the pixel electrode. In other words, the pixel electrode 110 of the present embodiment has the shape of a rectangular comb. In an LCD in which positively anisotropic LCs are used, the use of such a comb-like pixel electrode causes disclination to occur at a wider area near the open edges of the slits (i.e., near the y-axis directional edge of the pixel electrode); consequently, the orientation of the liquid crystal molecules becomes unstable. Thus, in the case of positively anisotropic LCs, pixel electrodes having closed-edged slits 40 are usually used.

However, the use of positively anisotropic LCs still entails the problem of disclination occurring near the closed edges of the slits 40, albeit at a smaller area, which is one of the causes lowering pixel transmittance. We have found, however, that the occurrence of disclination at the closed slit 40 edges can be suppressed by using negatively anisotropic LCs.

In addition, we have found that by using negatively anisotropic LCs, the occurrence of disclination at the slit edges can be suppressed even if the comb-like pixel electrode 110 having the open-edged slits 40 is used. In other words, the use of negatively anisotropic LCs allows the use of the comb-like pixel electrode 110 as well as suppression of disclination. This in turn improves pixel transmittance and screen luminance.

FIG. 3 is a cross section taken along line A-A of FIG. 1. As illustrated in FIG. 3, the gate insulating film 102 is formed on the TFT substrate 100, and a data line 20 is located on the gate insulating film 102 (the data line 20 extends in a direction perpendicular to the drawing plane of FIG. 3). The inorganic passivation film 106 is formed to cover the data line 20, and the organic passivation film 107 is deposited on the inorganic passivation film 106. Formed on the organic passivation film 107 is the common electrode 108. Further, the inter-layer insulating film 109 is deposited on the common electrode 108, and the pixel electrode 110 having the open-edged slits 40 is formed on the inter-layer insulating film 109. Over the pixel electrode 110 is the alignment film 111, which subjects the liquid crystal molecules to initial alignment.

Figure 4A:
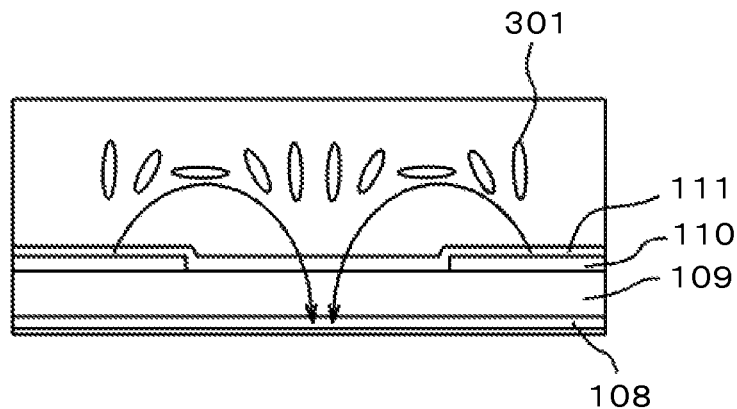
FIGS. 4A and 4B are diagrams illustrating the behavior of liquid crystal molecules according to a comparative example.
Figure 4B:
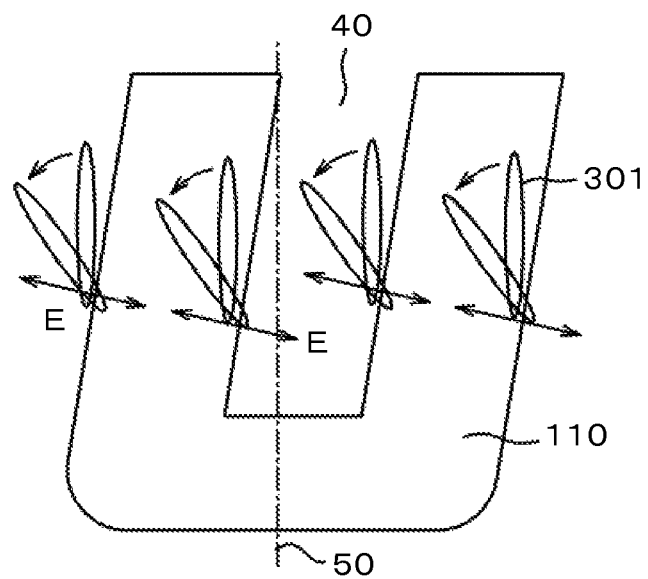

FIGS. 4A and 4B are diagrams illustrating the operation of an IPS LCD in which positively anisotropic LCs are used. FIG. 4A is a cross section illustrating the behavior of the liquid crystal molecules. As illustrated in FIG. 4A, an inter-layer insulating film 109 is deposited on a common electrode 108, and a pixel electrode 110 having closed-edged slits 40 is formed on the inter-layer insulating film 109. Further, an alignment film 111 is formed on the pixel electrode 110.

In FIG. 4A, when a voltage is applied to the pixel electrode 110, the resultant electric force lines reach the common electrode 108 through the liquid crystal layer and the closed-edged slits 40 of the pixel electrode 110. In the case of FIG. 4A in which positively anisotropic LCs are used, the liquid crystal molecules located near the center of the closed-edged slits 40 are more likely to rise. Also, when multiple domains are produced within the pixel, the liquid crystal molecules 301 near the domain boundaries are likely to rise in a direction normal to the TFT substrate. If the screen of the LCD is pressed, this tendency for those liquid crystal molecules to rise is further increased, resulting in a blur on the screen.

FIG. 4B is a plan view illustrating the behavior of liquid crystal molecules when positively anisotropic LCs are used. The pixel electrode 110 of FIG. 4B has the closed-edged slits 40. In the case of positively anisotropic LCs, the area of disclination is reduced by using such closed-edged slits. In FIG. 4B, the one-dot chain line represents the alignment axis 50 of the alignment film and is tilted by a particular angle with respect to the long axis of the pixel electrode 110 and the closed-edged slits 40. The arrows E of FIG. 4B represent the direction of electric fields, and the initial alignment direction 50 of the liquid crystal molecules is tilted by 10 to 15 degrees with respect to a direction perpendicular to the direction of electric fields so that the liquid crystal molecules rotate in the same direction. The unnamed arrows of FIG. 4B represent the rotational direction of the liquid crystal molecules 301.

Figure 5A:
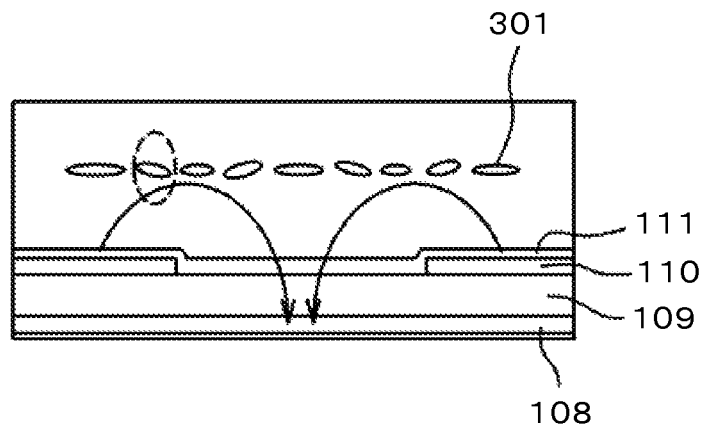
FIGS. 5A and 5B are diagrams illustrating the behavior of liquid crystal molecules according to the invention.
Figure 5B:
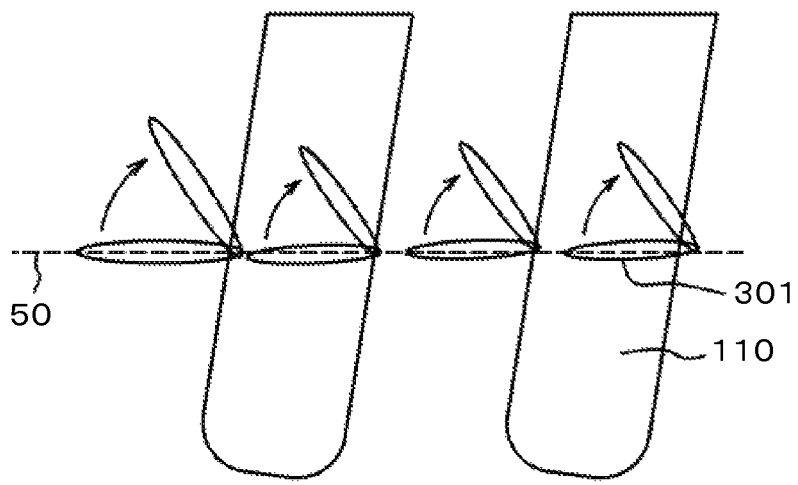

FIGS. 5A and 5B are diagrams illustrating the behavior of liquid crystal molecules according to an IPS scheme in which negatively anisotropic LCs are used. FIG. 5A is a cross section illustrating the behavior of those liquid crystal molecules. FIG. 5A is the same as FIG. 4A in terms of layer structure. As illustrated in FIG. 5A in which negatively anisotropic LCs are used, the liquid crystal molecules are less likely to rise in a direction normal to the TFT substrate than in the case of positively anisotropic LCs. Thus, when negatively anisotropic LCs are used, disclination is less likely to occur due to such properties of the liquid crystals.

FIG. 5B is a plan view illustrating the behavior of the molecules 301 of negatively anisotropic LCs. The pixel electrode 110 of FIG. 5B has the shape of a comb and has open-edged slits 40. Since disclination is less likely to occur in the case of negatively anisotropic LCs, the pixel electrode 110 can take the shape of FIG. 5B, and the transmittance rate can also be improved as discussed later with reference to FIG. 6. The unnamed arrows of FIG. 5B represent the rotational direction of the liquid crystal molecules 301.

In FIG. 5B, the alignment axis 50 of the alignment film extends in a lateral direction and is tilted by 10 to 15 degrees with respect to the direction of electric fields so that the liquid crystal molecules 301 rotate in the same direction. Since the liquid crystal molecules 301 are less likely to rise in a direction normal to the TFT substrate as illustrated in FIG. 5A, they rise only slightly if the screen of the LCD is pressed. Thus, the occurrence of blurs on the screen due to the rise of the liquid crystal molecules 301 can be suppressed.

As above, the use of negatively anisotropic LCs reduces the occurrence of disclination and suppresses the occurrence of blurs on the screen resulting from the rise of the liquid crystal molecules. It also improves the transmittance rate because the pixel electrode 110 can have the open-edged slits 40. FIG. 6 shows the relations between the shape of a pixel electrode and the transmittance rate of a pixel when negatively anisotropic LCs are used.

In FIG. 6, the comparative example represents the case where a pixel electrode 110 having closed-edged slits 40 is used. In contrast, the pixel electrode 110 of the present invention has the shape of a comb and has open-edged slits 40. Since negatively anisotropic LCs are used in both cases, the occurrence of disclination and blurs on the screen is less likely. On the other hand, if the transmittance rate in the case of the closed-edged slits 40 is assumed to be 100%, the transmittance rate in the case of the comb-like pixel electrode 110 becomes 103.7%, a 3.7% increase.

FIGS. 7A and 7B are plan views showing comparison between the areas of the openings of black matrices 202. In FIG. 7A, positively anisotropic LCs are used, and a pixel electrode 110 has closed-edged slits 40 as in conventional LCDs. In FIG. 7B, negatively anisotropic LCs are used, and a pixel electrode 110 has the shape of a comb (i.e., has open-edged slits 40) as in the present invention.

In the conventional pixel of FIG. 7A, the closed edges of the slits 40 of the pixel electrode 110 are covered with a black matrix 202 because disclination occurs near those edges. By contrast, in the pixel of the present invention shown in FIG. 7B, the influence of disclination is smaller since negatively anisotropic LCs are used. Thus, the opening of the black matrix 202 can be expanded upward up to the edges of the slits 40. In other words, as illustrated in FIG. 7B, the distance 'w' from the upper short-side edge of the pixel electrode 110 to the nearest inner short-side edge of the black matrix 202 can be reduced.

Further, as illustrated in the lower part of FIG. 7B, the pixel electrode 110 has the open-edged slits 40. This leads to an increased transmittance rate as discussed above with reference to FIG. 6. Moreover, in the pixel of FIG. 7B, the opening of the black matrix 202 can also be expanded downward up to the distal ends of the teeth of the comb-like pixel electrode 110 since the influence of disclination is smaller.

Thus, in accordance with the present invention, the area of disclination can be reduced, and the area of the opening of the black matrix 202 can be increased as well. This synergistic effect leads to an increased pixel transmittance rate and an increased screen luminance. Furthermore, by using negatively anisotropic LCs, the liquid crystal molecules are less likely to rise in a direction normal to the TFT substrate when the screen is pressed. This reduces the occurrence of blurs on the screen.

Embodiment 2

An IPS LCD has excellent viewing angle characteristics, but they may vary depending on the directions in which the viewer sees the screen, that is, on azimuth angles. To counter this, there is a method called the quasi-dual-domain scheme. In the method, two types of pixels in which the liquid crystal molecules rotate in different directions are used, and the azimuth angle characteristics are made uniform by particular combinations of these two types of pixels.

Figure 8:
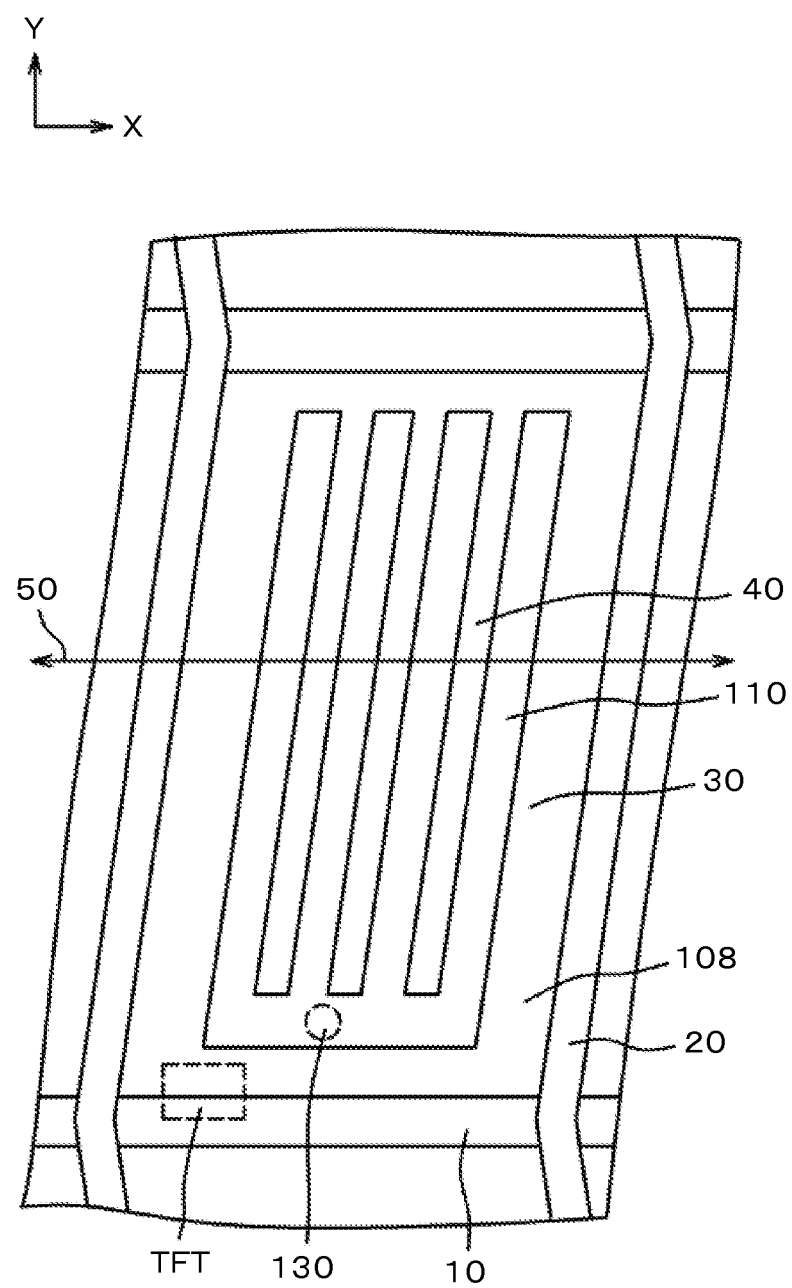
FIG. 8 is a plan view illustrating the structure of a pixel according to Embodiment 2 of the invention.

FIG. 8 is a plan view of a pixel of a quasi-dual-domain LCD according to Embodiment 2 of the invention. In FIG. 8, the alignment axis 50 extends in the x direction. The long axis of the slits 40 of a pixel electrode 110 is tilted by +θ degrees with respect to a direction perpendicular to the alignment axis 50. In this case, application of a voltage to the pixel electrode 110 causes the liquid crystal molecule to rotate in the left direction.

Though not illustrated, the pixel electrodes of the two pixels located directly above and below the pixel of FIG. 8 are tilted in the direction opposite to the tilt direction of the pixel electrode 110 of FIG. 8. Specifically, in each of those two pixels, the long axis of the slits 40 of the pixel electrode 110 is tilted by −θ degrees with respect to a direction perpendicular to the alignment axis 50. Thus, in those two pixels, application of a voltage to the pixel electrode 110 causes the liquid crystal molecules to rotate in the right direction. Therefore, by alternately arranging such two different types of pixels in the y direction, the viewing angle characteristics are less subject to change with azimuth angles.

The present invention can also be applied to such an LCD. In FIG. 8, the pixel electrode 110 has the open-edged slits 40 and has the shape of an obliquely tilted comb. In other words, the pixel electrode 110 of the present embodiment is in the shape of a parallelogram comb. Further, in the present embodiment as well, negatively anisotropic LCs are used. By adopting such a structure, advantageous effects similar to those of Embodiment 1 can be achieved. That is, the transmittance rates of pixels can be increased, and the screen is less likely to have a blur when pressed.

Embodiment 3

Figure 9:
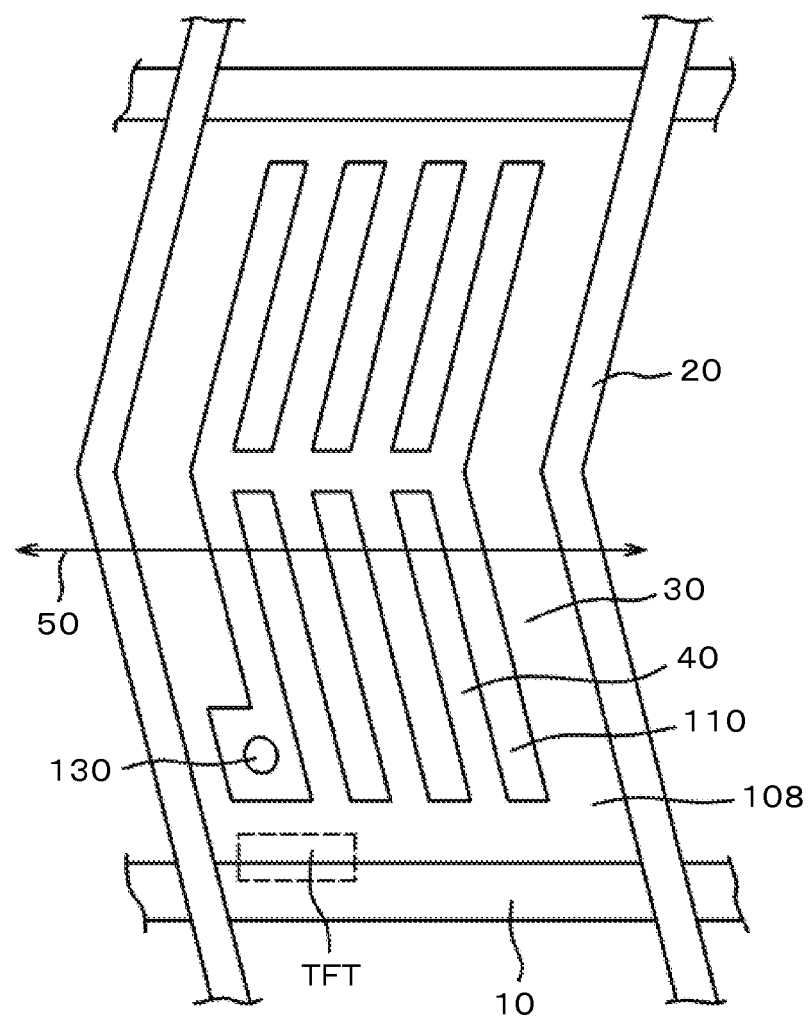
FIG. 9 is a plan view illustrating the structure of a pixel according to Embodiment 3 of the invention.

In another method for lessening the dependency of viewing angle characteristics on azimuth angles, two domains in which liquid crystal molecules rotate in different directions are created within a pixel. FIG. 9 is an example of a pixel of such an LCD to which the invention is applied. As illustrated in FIG. 9, two data lines 20 that outline the pixel are bent near the center of the pixel, and a pixel electrode 110 includes upper and lower slits 40 that extend from its central bus electrode. The alignment axis 50 of the alignment film extends in the x direction. Although the upper half and lower half of the pixel electrode 110 are both in the shape of a comb, the long-axis angle of the teeth of the upper half with respect to a direction perpendicular to the alignment axis 50 (i.e., with respect to the y-axis) is opposite to that of the lower half. In other words, the upper and lower slits 40 of the pixel electrode 110 have different long-axis angles with respect to the y-axis.

Thus, when a voltage is applied to the pixel electrode 110, the rotational direction of the liquid crystal molecules in the upper half of the pixel is opposite to that in the lower half. As a result, the dependency of viewing angle characteristic on azimuth angles can be lessened. Such a method is usually referred to as the dual-domain scheme. In the case of the dual-domain scheme, however, disclination tends to occur near the boundary between the upper half and lower half of a pixel since the rotational direction of the liquid crystals is different for the upper half and for the lower half as in FIG. 9. Consequently, the transmittance rate of the pixel may be reduced.

In the present embodiment, however, negatively anisotropic LCs are used, and the upper edges of the upper slits 40 and the lower edges of the lower slits 40 of the pixel electrodes 110 are open. This leads to an increased pixel transmittance rate, as already discussed in the section of Embodiment 1. On the other hand, it is certain that disclination will occur since the rotational direction of the liquid crystal molecules is different for the upper half and for the lower half of the pixel. The area in which this disclination occurs corresponds to the bent section of the pixel electrode 110.

Thus, in the present embodiment, the bent section of the pixel electrode 110 is used as a bus electrode that supplies a voltage to each tooth of the comb-like pixel electrode 110. Since disclination occurs near that section (i.e., the bus electrode), it is light-blocked, for example, by an electrode below the pixel electrode 110 or by a black matrix 202 formed underneath the counter substrate.

Although the above light blocking is necessary, the present embodiment is still capable of improving the pixel transmittance rate at the upper edges of the upper slits 40 and at the lower edges of the lower slits 40 since these edges are open. By contrast, a conventional pixel electrode according to the dual-domain scheme cannot achieve a sufficient pixel transmittance rate because the slits are closed at their upper and lower edges for the purpose of suppressing disclination.

In summary, the present embodiment can also be applied to a dual-domain pixel electrode. By using negatively anisotropic LCs, the transmittance rate can be increased at the upper edges of the upper slits and the lower edges of the lower slits of the pixel electrode, whereby the luminance of the screen can be increased. Further, since the molecules of the negatively anisotropic LCs are less likely to rise in a direction normal to the TFT substrate as discussed in the section of Embodiment 1, the screen is less likely to have a blur when pressed.

What is claimed is:

1. A liquid crystal display device comprising:
    a plurality of gate lines extending in a first direction and arranged in a second direction;
    a plurality of data lines extending in the second direction and arranged in the first direction;
    a plurality of pixels formed by the intersection of the plurality of gate lines and the plurality of data lines, each of the plurality of pixels having a pixel electrode;
    a TFT substrate having the plurality of pixels formed thereon in the form of a matrix;
    a counter substrate;
    a black matrix formed on the counter substrate; and
    a liquid crystal layer sandwiched between the TFT substrate and the counter substrate,
    wherein a common electrode is formed below the pixel electrode with an inter-layer insulating layer located therebetween,
    wherein the liquid crystal layer includes liquid crystals with negative dielectric anisotropy,
    wherein the pixel electrode includes a slit being open at an edge on one side,
    wherein the liquid crystals do not align in a direction of a line of an electric force at a transversal center of the slit,
    wherein the black matrix includes a plurality of openings, each of the plurality of openings having a first side extending in the first direction, and
    the slit at the edge on the one side of the pixel electrode does not overlap with the black matrix in a plan view.

2. The liquid crystal display device of claim 1, wherein the pixel electrode has the shape of a rectangular comb.

3. The liquid crystal display device of claim 1, wherein the pixel electrode has the shape of a parallelogram comb.

4. The liquid crystal display device of claim 1, wherein the slit at the edge on the one side of the pixel electrode coincides with the first side of the black matrix in a plan view.

5. A liquid crystal display device comprising:
    a plurality of gate lines extending in a first direction and arranged in a second direction;
    a plurality of data lines extending in the second direction and arranged in the first direction;
    a plurality of pixels formed by the intersection of the plurality of gate lines and the plurality of data lines, each of the plurality of pixels having a pixel electrode;
    a TFT substrate having the plurality of pixels formed thereon in the form of a matrix;
    a counter substrate;
    a black matrix formed on the counter substrate; and
    a liquid crystal layer sandwiched between the TFT substrate and the counter substrate,
    wherein a common electrode is formed below the pixel electrode with an inter-layer insulating layer located therebetween, wherein the liquid crystal layer includes liquid crystals with negative dielectric anisotropy, and wherein the pixel electrode includes:

a bus electrode extending in the first direction;

a first comb-shaped electrode connected to one side of the bus electrode and tilted by a particular angle with respect to the second direction;

a second comb-shaped electrode connected to an other side of the bus electrode and tilted with respect to the second direction by the particular angle in a direction opposite to the tilt direction of the first comb-shaped electrode, a first slit formed between a portion of the first comb-shaped electrode and another portion of the first comb-shaped electrode, the first slit being open at an opposite side to the one side of the bus electrode, a second slit formed between a portion of the second comb-shaped electrode and another portion of the second comb-shaped electrode, the second slit being open at an opposite side to the other side of the bus electrode, wherein the liquid crystals do not align in a direction of a line of an electric force at a transversal center of the first slit, wherein the black matrix includes a plurality of openings, each of the plurality of openings having a first side extending in the first direction, and the first slit at the opposite side to the one side of the bus electrode does not overlap with the black matrix in a plan view.

6. The liquid crystal display device of claim 5, wherein a video signal is transmitted to the first and second comb-shaped electrodes of the pixel electrode via the bus electrode.

7. The liquid crystal display device of claim 5, wherein the first slit at the edge on the one side of the pixel coincides with the first side of the black matrix in a plan view.

8. A liquid crystal display device comprising:

a TFT substrate having a plurality of data lines arranged in a first direction, a plurality of gate lines arranged in a second direction, a plurality of TFTs, and a plurality of pixels;

a common electrode on the TFT substrate;

an inter-layer insulating layer on the common electrode;

a pixel electrode on the inter-layer insulating layer;

a counter substrate opposed to the TFT substrate;

a black matrix formed on the counter substrate; and a liquid crystal layer sandwiched between the TFT substrate and the counter substrate, wherein the liquid crystal layer includes liquid crystals with negative dielectric anisotropy, wherein the pixel electrode is formed in each of the plurality of pixels, and having a plurality of comb-like electrodes separated by a slit, the plurality of comb-like electrodes are connected by a connecting portion at one side, the plurality of comb-like electrodes are not connected at another side, the pixel electrode is connected to each of the TFTs via the connecting portion through a through hole, wherein the slit is open at the another side of the plurality of comb-like electrodes, wherein the liquid crystals do not align in a direction of a line of an electric force at a transversal center of the slit, the connecting portion overlaps with the black matrix in a plan view, and the slit at the another side does not overlap with the black matrix in a plan view.

9. The liquid crystal display device of claim 8, wherein the pixel electrode is not overlapped with each of the plurality of the gate lines and each of the plurality of the data lines.

10. The liquid crystal display device of claim 8, wherein the plurality of comb-like electrodes are in a same length in the second direction.

11. The liquid crystal display device of claim 8, wherein one of the plurality of comb-like electrodes has a protrusion which is extending in the first direction.

* * * * *